United States Patent [19]

Nakayama et al.

[11] 4,268,225

[45] May 19, 1981

[54] STRUCTURE OF A SHOE FOR A SWASH PLATE TYPE COMPRESSOR

[75] Inventors: Shozo Nakayama; Kimio Kato; Tomoo Fujii, all of Kariya, Japan

[73] Assignee: Kabushiki Kaisha Toyoda Jidoshokki Seisakusho, Aichi, Japan

[21] Appl. No.: 971,210

[22] Filed: Dec. 20, 1978

[30] Foreign Application Priority Data

Dec. 27, 1977 [JP] Japan ................................ 52/159736

[51] Int. Cl.[3] .......................... F04B 1/14; F16C 27/04; F16C 7/00

[52] U.S. Cl. .............................. 417/269; 308/DIG. 7; 308/3 C

[58] Field of Search ......................... 417/269; 264/273; 308/DIG. 7, 3 C; 74/60; 123/58 AA, 58 BA; 92/249

[56] References Cited

U.S. PATENT DOCUMENTS

| | | | |
|---|---|---|---|
| 2,022,917 | 12/1935 | Larkin | 308/3 C |
| 3,001,900 | 9/1961 | Frieder et al. | 264/273 |
| 3,221,564 | 12/1965 | Raymond | 74/60 |
| 3,670,071 | 6/1972 | Walche et al. | 264/273 |
| 3,783,748 | 1/1974 | Cunningham | 92/249 |
| 4,037,522 | 7/1977 | Inoshita | 92/71 |

FOREIGN PATENT DOCUMENTS

| | | | |
|---|---|---|---|
| 621930 | 6/1961 | Canada | 308/DIG. 7 |
| 1425998 | 3/1969 | Fed. Rep. of Germany | 308/DIG. 7 |
| 1506094 | 4/1978 | United Kingdom | 308/DIG. 7 |

*Primary Examiner*—William L. Freeh

*Attorney, Agent, or Firm*—Burgess, Ryan and Wayne

[57] ABSTRACT

A shoe for incorporation into a swash plate type compressor is structured such that tetrafluoroethylene resin material forming a first and second main portions of the shoe contains a metalic reinforcing member embedded between the two main portions the first main portion made of the tetrafluoroethylene is provided with a flat surface contacting a swash plate of the compressor. The second main portion made of the tetrafluoroethylene is formed with a round recess for receiving a ball bearing operatively connected to a piston of the compressor. The reinforcing member is positioned close to the round recess and far from the flat surface.

10 Claims, 11 Drawing Figures

STRUCTURE OF A SHOE FOR A SWASH PLATE TYPE COMPRESSOR

FIELD OF THE INVENTION

The present invention relates to a swash plate type compressor for use in air conditioning systems for vehicles and, in particular, to an improved structure of shoes incorporated into a swash plate type compressor for the purpose of providing means for transmitting an axial force from a rotating swash plate to pistons axially reciprocating within cylinder bores of the compressor.

BACKGROUND OF THE INVENTION

A typical swash plate type compressor as disclosed in, for example, U.S. Pat. Nos. 3,801,227 of Nakayama and 3,955,889 of Nakayama et al, has a pair of horizontal axially aligned cylinder blocks which forms a combined block. Inside the combined block are formed axially extending cylinder bores, the cylinder block being closed at both ends by front and rear housings, via valve plates. Centrally passing through the combined block, a drive shaft is rotatably supported by suitable bearing means. To the middle of the drive shaft is fixed a swash plate operatively connected to, via ball bearings and shoes, double acting pistons slidably fitted in the cylinder bores. Thus, the rotating of the swash plate causes reciprocal compressing motion of the pistons within the cylinder bores. The front and rear housings are formed with refrigerant suction chambers and refrigerant discharge chambers, which are interconnected with the cylinder bores and are connectable to an outside air conditioning circuit by means of appropriate refrigerant flow pipelines. The typical swash plate type compressor is provided with means for lubricating the swash plate and movable or slidable parts of the compressor, such as bearing means, ball bearings, shoes and pistons. According to this lubricating means, oil separated from oil suspended refrigerant is distributed toward the above-mentioned movable or slidable parts, without employing an oil pump means. Some typical swash plate type compressors are also provided with means for introducing a part of all of the oil suspended refrigerant into a swash plate chamber in which the swash plate is rotatably accommodated, so that the oil suspended refrigerant per se contributes to lubrication of the swash plate, ball bearings and shoes. The above-mentioned lubricating means employing no oil pump means is very advantageous for reducing the size and weight of the typical swash plate type compressor. On the other hand, the above-mentioned lubricating means is defective in that before the running speed of the typical swash plate type compressor reaches a given high speed range, the amount of the oil suspended refrigerant returned from the air conditioning circuit to the compressor is very small. Therefore, lubricating oil sufficient for appropriately lubricating the swash plate and the diverse movable or slidable parts of the compressor is not acquired. Particularly, achieving continuous appropriate lubrication of the contacting portion of the shoes and the swash plate is very difficult. This is because, during the operation of the compressor, a very large surface pressure reaching 100 through 300 kg/cm$^2$ acts in said contacting portion, and also, because the shoes perform very complicated motions during the operation of the compressor, whereby the relative position of the shoes with respect to the surface of the swash plate frequently varies. That is, the above-mentioned large surface pressure together with the complicated motion of the swash plate prevent the formation of a film of the lubricating oil in the contact portion of the shoes and the swash plate. As a result, direct contact of each of the shoes and the swash plate without intervention of the film of the lubricating oil occurs generating a high temperature friction heat. Therefore, smooth operation of the compressor is prevented, whereby the compressing efficiency of the compressor is decreased. Further if the generation of the high temperature friction heat continues for a long time, seizure of the shoes is caused, whereby the compressor will finally be broken.

Additionally, when the typical swash plate type compressor is applied to the air conditioning of a vehicle, the compressor is usually placed in the engine compartment of the vehicle. Therefore, the compressor is subjected to high temperature. As a result, the compressor is heated up. Therefore, the viscosity of the oil suspended in the refrigerant is lowered, whereby the lubrication effect of the oil is necessarily degraded. This degradation of the lubricating effect of the oil is also one cause for occurence of the direct contact of the shoes and the swash plate which causes a reduction in compressing efficiency of the compressor or breakage of the compressor.

With the above-mentioned typical swash plate type compressor, the shoes are generally made of materials selected from a metal and an alloy. The choice of the materials of the shoes depends on the material of which the swash plate is made. In the case where the swash plate is made of ferrous metal, the shoes are made of ferrous metal coated with a layer of an alloy of copper and lead, having a high resistance to wear and seizure. In the case where the swash plate is made of an aluminum alloy, the shoes are made of one of an aluminum alloy containing 14 through 30 percent silicone and ferrous metals which have a high resistance to wear, and have a high mechanical strength, respectively. However, the shoes made of aluminum alloy containing 14 through 30 percent silicone are defective in that the resistance to a mechanical shock applied to the shoes during the operation of the compressor is low, and resistance to burning is also low as long as the typical swash plate type compressor employs the afore-mentioned lubricating means with no oil pump. On the other hand, the shoes made of a ferrous metal or of a ferrous metal coated with a layer of an alloy of copper and lead is defective in that the weight of the shoes become large, thus increasing the weight of the typical swash plate type compressor. Further, the large weight of the shoes prevents the shoes per se from being smoothly moved during the operation of the compressor.

SUMMARY OF THE INVENTION

An object of the present invention is to provide a novel shoe for use in swash plate type compressors, which is improved in its resistance to wear and seizure over the above-mentioned conventional shoes.

Another object of the present invention is to provide a novel structure of shoes for use in swash plate type compressors, which has a high resistance to mechanical shock applied to the shoes during the operation of the compressor.

In accordance with the present invention, shoes for use in swash plate type compressors are characterized by such a novel structure that tetrafluoroethylene which forms the principal portion of the shoes contains therein a metalic reinforcing member embedded in the principal portion. The present invention will be made become more apparent from the ensuing description, with reference to the accompanying drawings, wherein.

Figure 1:
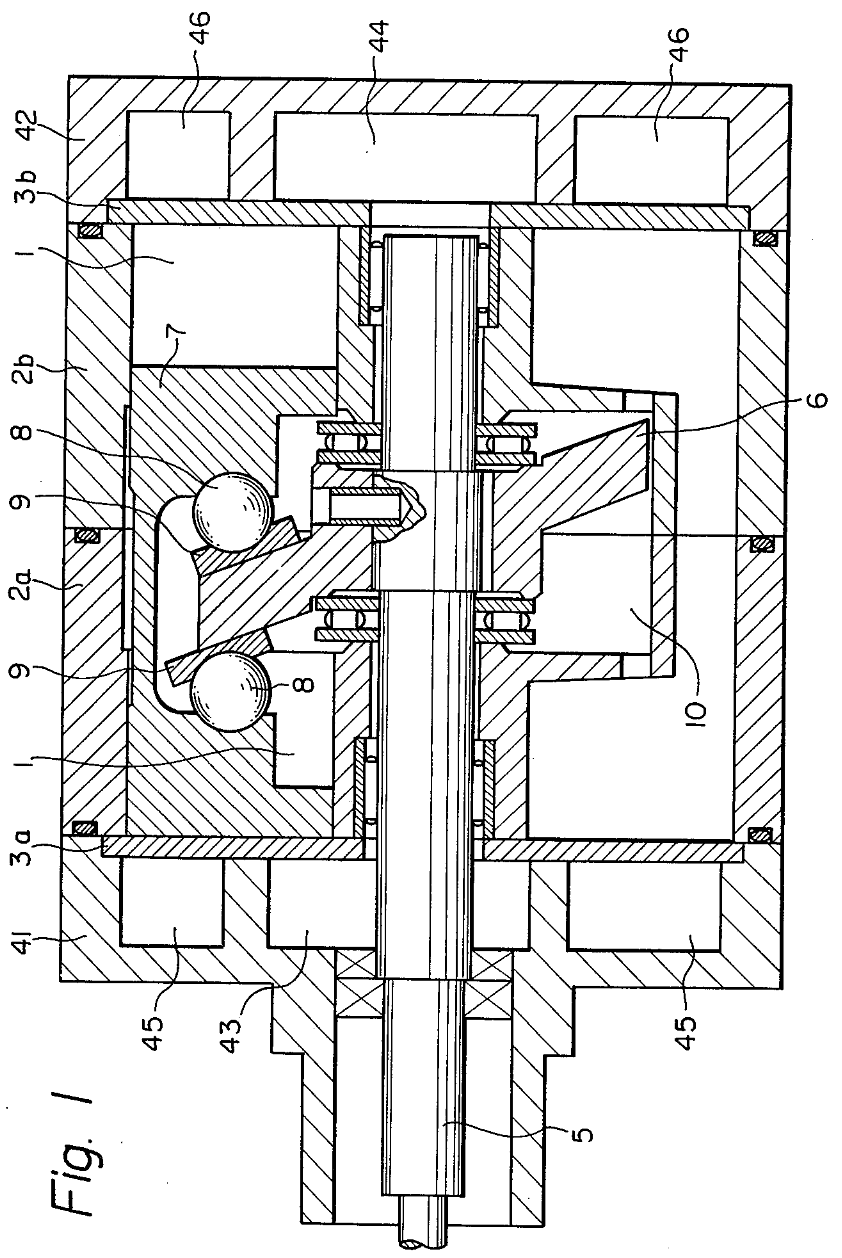
FIG. 1 is a longitudinal cross-sectional view of one typical swash plate type compressor.

Referring to FIG. 1, illustrating a typical swash plate type compressor of recent use, the compressor has a pair of cylinder blocks, i.e. a front cylinder block 2*a* and a rear cylinder block 2*b*, combined with each other in axial alignment, and thereby forming a combined cylinder block. The combined cylinder block is provided with axially extending cylinder bores 1 arranged in parallel with each other around the central axis of the combined cylinder block. The front end of the combined cylinder block is closed by a front housing 41, via a valve plate 3*a*, and the rear end of the combined cylinder block is closed by a rear housing 42, via a valve plate 3*b*. Coaxially passing through both cylinder blocks 2*a*, 2*b*, front housing 41, and front valve plate 3*a*, a drive shaft 5 is rotatably supported by suitable bearing means, and is provided with a swash plate 6 secured to the middle of the drive shaft 5. The swash plate 6 is operatively connected with, via ball bearings 8 and disc-shape shoes 9, double acting multi-pistons 7 which are slidably fitted in the cylinder bores 1. The combined cylinder block is also provided with a swash plate chamber 10 past which the swash plate 6 rotates with the drive shaft 5. The front housing 41 and the rear housing 42 are formed with refrigerant suction chambers 43 and 44, respectively, through which the refrigerant having returned from an outside air conditioning system is eventually sucked into the cylinder bores 1 in order to be subjected to a compression effect. The front and rear housings 41, 42 are also formed with refrigerant discharge chambers 45, 46, respectively, through which the compressed refrigerant is discharged toward the outside air conditioning system. The compression of the refrigerant is attained by the reciprocal compressing motion of the pistons 7 within the cylinder bores 1, which is caused by the rotating motion of the swash plate 6 with the drive shaft 7. That is to say, an axial force for causing the reciprocal compressing motion of the pistons 7 is transmitted from the swash plate 6 to the pistons 7 by means of the shoes 9 and ball bearings 8.

Figure 2:
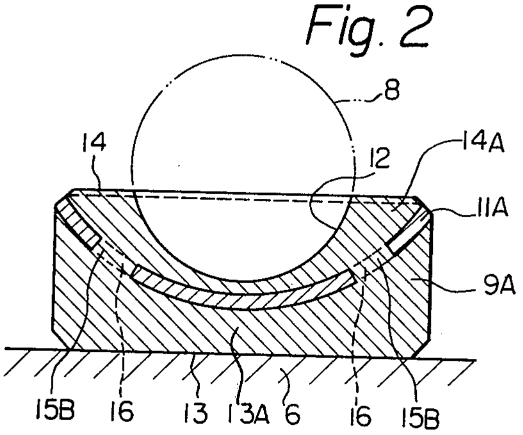
FIG. 2 is a cross-sectional view of a shoe according to a first embodiment of the present invention.
Figure 3A:
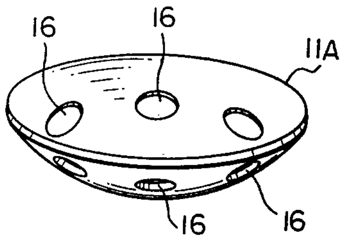
FIG. 3A is a perspective view of a reinforcing member employed in the first embodiment of FIG. 2.

FIGS. 2 and 3A illustrate the shoe of a first embodiment of the present invention. The shoe 9A, generally formed in a disc-like shape having a preselected axial thickness, consists of first and a second main portions 13A and 14A, connecting portions 15B and a reinforcing member 11A. The first and second main portions 13A, 14A and the connecting portions 15B are made of tetrafluoroethylene resin material, while the reinforcing member 11A is made of a metalic material, such as spring steel or carbon steel, which has a coefficient of thermal expansion smaller than that of the tetrafluoroethylene. The reinforcing member 11A is embedded between the first and second main portions 13A and 14A, and has the outermost edge of which the diameter is substantially equal to the diameter of the shoe 9A. The reinforcing member 11A per se is produced by forming a spring steel sheet or a carbon steel sheet into a cup-like member having a plurality of small bores 16 arranged in the round surface of the cup-like member. The formation of the cup-like member is performed by employing a conventional stamping method. Production of the shoe 9A is carried out by a conventional molding method. That is to say, after positioning the reinforcing member 11A in a molding device, the tetrafluoroethylene resin material is filled into the molding device, so that the first and second main parts 13A and 14A are formed on both sides of the reinforcing member 11A, and so that the connecting portions 15B are formed in the bores 16 of the reinforcing member 11A. The first main protion 13A has a flat surface 13 which contacts the swash plate 6 (FIG. 1) when the shoe 9A is incorporated into a swash plate compressor. The second main portion 14A has a flat surface 14 and a central round recess 12 provided for receiving the bearing ball 8 (FIG. 1).

Figure 3B:
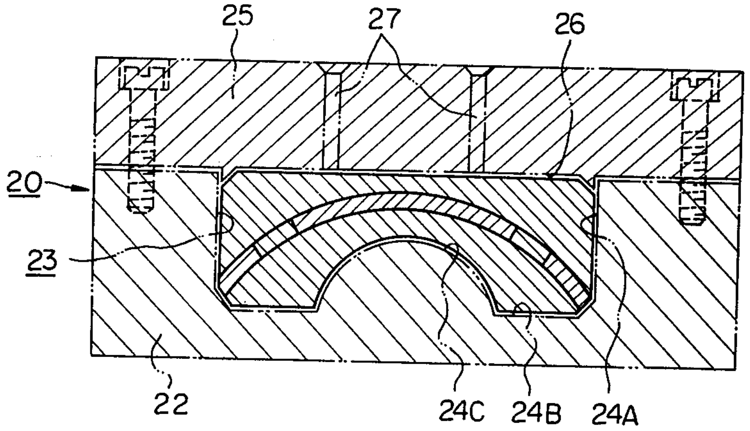
FIG. 3B is a cross-sectional view of a molding device for forming the shoe of FIG. 1.

The molding method for producing the shoe 9A is hereinbelow described in detail with reference to the illustration of FIG. 3B. In FIG. 3B, a molding device 20 consists of a lower mold 22 having therein a molding chamber 23 surrounded by a cylindrical wall 24A, bottom surface 24B and a round convex surface 24C, and; an upper mold 25 having a flat molding surface 26 and ports 27, through which molding material (the resin of the tetrafluoroethylene) is filled into the molding device 20. As will be understood from FIG. 3B, when the upper mold 25 and the lower mold 22 are mated together, the molding chamber 23 has the shape corresponding to the outer shape of the shoe 9A.

The molding process of the shoe 9A is carried out as follows. Firstly, the reinforcing member 11A is placed in the lower mold 22 so that the concave surface of the reinforcing member 11A confronts the round convex surface 24C of the lower mold 22. Secondly, the upper mold 25 is placed onto the lower mold 22, so that both molds 22 and 25 are mated together. Thereafter, the resin of the tetrafluoroethylene is poured through the ports 27, so that the resin of the tetrafluoroethylene completely fills the entire space of the molding chamber 23, enclosing the reinforcing member 11A. Finally, the entire set of the molding device 20 is subjected to a solidifying process. After the solidifying process, the upper mold 25 is disassembled from the lower mold 22, and the shoe 9A is taken out of the lower mold 22. The solidifying process consists of a drying process in the case where the liquid resin of tetrafluoroethylene is employed. In the case where the powdery resin of tetrafluoroethylene is employed, the solidifying process consists of a pressurizing process wherein a high pressure is applied to the powdery resin of tetrafluoroethylene filled in the molding device 20.

Figure 4:
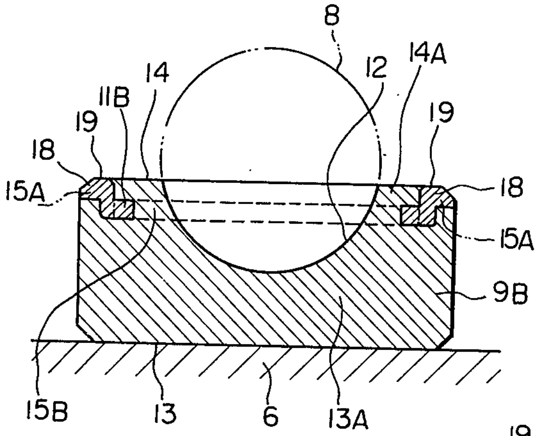
FIG. 4 is a cross-sectional view of a shoe according to a second embodiment of the present invention.
Figure 5:
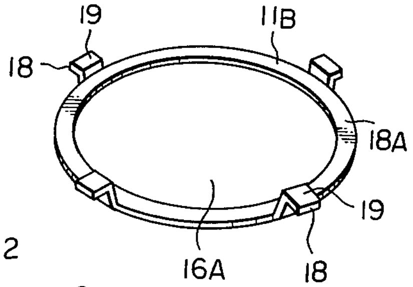
FIG. 5 is a perspective view of a reinforcing member employed in the second embodiment of FIG. 4.

FIGS. 4 and 5 show a second embodiment of the present invention in which a round disc-shaped shoe 9B includes a substantially ring-shaped reinforcing member 11B. The reinforcing member 11B is made of a metallic material similar to that of the reinforcing member 11A of FIG. 3A. The reinforcing member 11B can also be manufactured from a metallic sheet material by employing the stamping method. The reinforcing member 11B is provided with a plurality of L-shaped legs 18, which upwardly and outwardly project from the annular portion 18A of the member 11B. The legs 18 having a positioning surface 19, respectively, are provided for accurately positioning the member 11B in the shoe 9B. Every positioning surface 19 lies in the same plane. Production of the shoe 9B can be carried out in the same way as that of the shoe 9B by employing the same molding device 20 as illustrated in FIG. 3B. That is to say, the reinforcing member 11B is initially positioned in the lower mold 22 (FIG. 3B), so that every positioning surface 19 is seated on the bottom surface 24B (FIG. 3B) of the lower mold 22. Then, the upper mold 25 (FIG. 3B) is placed onto the lower mold 22. Thereafter, the resin of the tetrafluoroethylene is poured into the molding chamber 23 (FIG. 3B). After the molding chamber 23 is filled with said resin, the entire set of the molding device 20 is subjected to a solidifying process in the conventional way. Upon completion of the solidifying process, the upper and lower molds 25 and 22 (FIG. 3B) are disassembled, and the completed shoe 9B is taken out of the molding chamber 23. It should, however, be noted that in the shoe 9B, connecting portions 15A, for connecting the first and second main portions 13A, 14A to the reinforcing member 11B, are provided between adjacent legs 18 of the reinforcing member 11B. Provision of the connecting portions 15A, in addition to the connecting portion 15B formed in the central bore 16A of the member 11B, is effective for preventing disconnection of the first and second main portions 13A, 14A, made of tetrafluoroethylene, from the metallic reinforcing member 11B while the shoe 9B is incorporated in a swash plate type compressor and is being subjected to pressures and shocks during the operation of the compressor. The diameter of the annular portion of the reinforcing member 11B is smaller than the outer diameter of the shoe 9B, so that the member 11B is completely embedded in the first and second main portions 13A and 14A.

Figure 6:
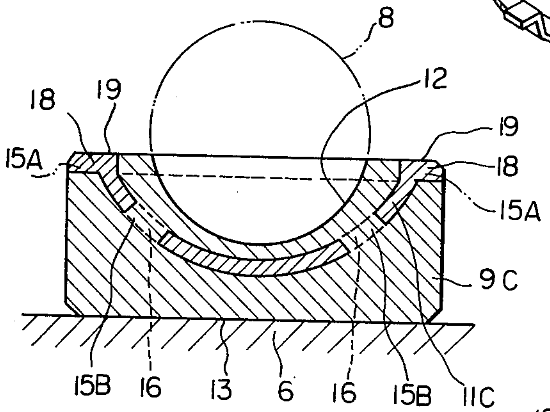
FIG. 6 is a cross-sectional view of a shoe according to a third embodiment of the present invention.
Figure 7:
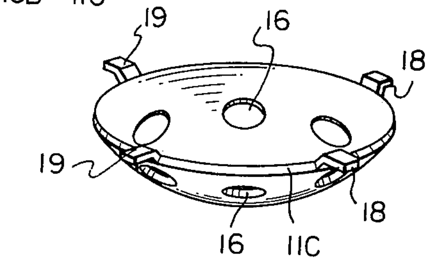
FIG. 7 is a perspective view of a reinforcing member employed in the third embodiment of FIG. 6.

FIGS. 6 and 7 illustrate a third embodiment of the present invention. A round disc-shaped shoe 9C of the third embodiment resembles the shoe 9A of the first embodiment. One difference of the third embodiment from the first embodiment resides in the fact that the cup-like reinforcing member 11C of the third embodiment is provided with a plurality of L-shape legs 18 having a positioning surface 19, respectively. The effect of provision of the legs 18 for the reinforcing member 11 is the same as that described hereinbefore with respect to the second embodiment of FIGS. 4 and 5. The other difference of the third embodiment from the first embodiment resides in the fact that the diameter of the cup-like portion of the reinforcing member 11C is smaller than that of the reinforcing member 11A, so that connecting portions 15A, in addition to the connecting portions 15B formed in the bores 16 of the reinforcing member 11C, are provided between adjacent legs 18 of the reinforcing member 11C of the shoe 9C. Therefore, it will be understood that mmechanical connection between the first and second main portions 13A, 14A and the reinforcing member 11C is stronger than that between the first and second main portions 13A, 14A and the reinforcing member 11A of the first embodiment. Production of the shoe 9C of the third embodiment can, of course, be carried out in the same way as in the case of the shoe 9A, employing the molding device 20 shown in FIG. 3B.

Figure 8:
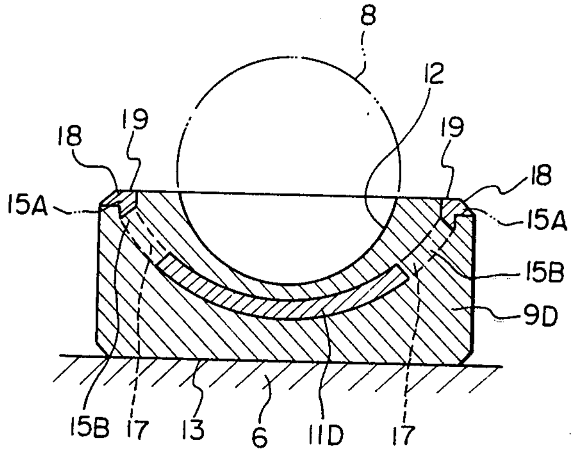
FIG. 8 is a cross-sectional view of a shoe according to a fourth embodiment of the present invention.
Figure 9:
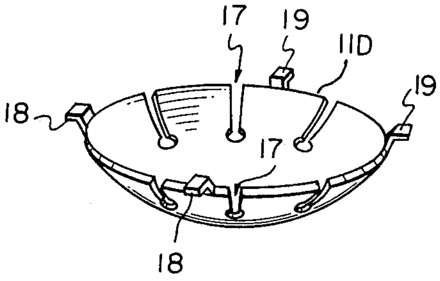
FIG. 9 is a perspective view of a reinforcing member employed in the fourth embodiment of FIG. 8.

FIGS. 8 and 9 illustrate a round disc-shape shoe 9D according to a fourth embodiment of the present invention, in which a reinforcing member 11D made of spring steel material or carbon steel material is embedded between the first and second main portions 13A and 14A made of the resin of tetrafluoroethylene. As shown in FIG. 9, the reinforcing member 11D, having a cup-like shape, is provided with legs 18 similar to those of the reinforcing member 11C of the third embodiment. The member 11D is also provided with a plurality of slits 17, each extending radially from the edge of the member 11D toward the round bottom of the member 11D. When the reinforcing member 11D is embedded between the first and second main parts 13A and 14A, the slits 17 of the member 11D are filled with the tetrafluoroethylene resin material. Therefore, the resin material filling the slits 17 forms the connecting portions 15B. The resin material filling spaces between adjacent legs 18 forms the connecting portions 15A. These connecting portions 15A, 15B act to strongly connect the first main portion 13A and the second main portion 14A which are arranged on both sides of the reinforcing member 11D. This fact means that the reinforcing member 11D is completely enveloped by the tetrafluoroethylene resin material forming the frist and second main portions 13A and 14A and the connecting portions 15A and 15B. As a result, even if the shoe 9D is subjected to strong pressure or mechanical shock, separation of the main portions 13A, 14A from the reinforcing member 11D does not occur. Further, provision of the slits 17 for the reinforcing member 11D permits the member 11D per se to be easily, elastically deformed. This fact means that when the reinforcing member 11D is embedded between the first and second main parts 13A and 14 of the shoe 9D, the member 11D operates to absorb any mechanical shock applied to the shoe 9D.

With the structure of each of the shoes 9A through 9D, it should be noted that arrangement of the reinforcing member made of a metallic material is selected so that the thickness of the first main portion 13A, having the surface 13 contacting the swash plate 6 of a swash plate type compressor, is generally larger than that of the second main portion 14A, having the round recess 12 for receiving the bearing ball 8. This particular arrangement of the reinforcing member in the inside of the shoe of the present invention can exhibit a particular advantageous effect described hereinafter with reference to FIG. 10.

The description of various advantageous effects derived from adopting the shoe of the present invention for a swash plate type compressor will be provided hereinbelow.

(1) Since the shoe according to the present invention is structured in such a way that a reinforcing member made of a metalic material having both strength and elasticity, is enveloped by the tetrafluoroethylene resin material having a large resistance to heat, and appropriate flexibility, the shoe can have a large resistance to seizure as well as to mechanical shock. (2) The flexible property of the tetrafluoroethylene is effective for absorbing any shock applied to the shoe. That is to say, the shoe per se is able to operate as a shock absorber. Therefore, any noise caused by mechanical shock applied to the shoe can be extremely reduced.

Figure 10:
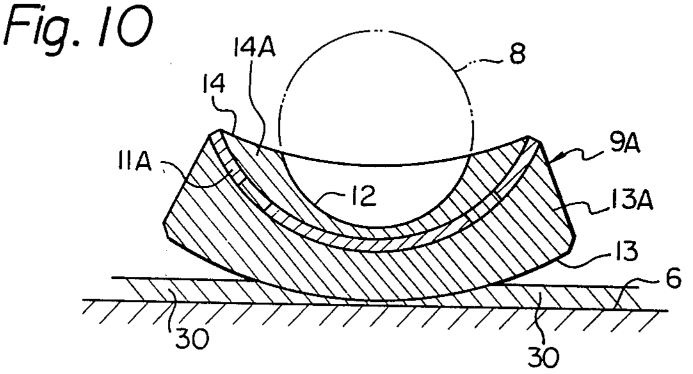
FIG. 10 is a cross-sectional view illustrating a change in the shape of the shoe according to the first embodiment of the present invention.

(3) Even if the shoe of the present invention is subjected to a high temperature for a long time within a swash plate type compressor, during the operation of said compressor, an excellent lubrication of the shoe by employing the oil suspended in the refrigerant is continuously maintained. Therefore, the swash plate type compressor smoothly operates, maintaining the compression efficiency thereof at a high level. The reason the excellent lubrication of the shoe is continuously maintained can be explained in the following way. That is, when the shoe of the present invention is incorporated into a swash plate type compressor and while said shoe is subjected to a high temperature during the operation of the compressor, a change in the shape of the shoe occurs such that the surface 13 of the main portion 13A is transformed into a round convexed surface. FIG. 10 illustrates, for example, how the shape of the shoe according to the first embodiment of the present invention occurs. The round convexed surface of the shoe permits formation of an oil wedge 30 between the surface 13 of the shoe and the surface of the swash plate 6 (FIG. 1) of the compressor. As a result, the shoe can be always lubricated by the oil of the oil wedge 30. Consequently, the afore-mentioned excellent lubrication of the shoe of the present invention can be continuously maintained during the operation of the compressor.

A description will be provided hereinbelow with respect to causes for occurence of the change in the shape of the shoe according to every embodiment of the present invention.

One cause is that the coefficient of the thermal expansion of the tetrafluoroethylene resin material forming the first and second main portions 13, 14 of the shoe is larger than that of the metallic material forming the reinforcing member 11A, 11B, 11C or 11D. The other cause is the afore-mentioned particular arrangement of the reinforcing member in the inside of the shoe. Because of the above two causes, in the main portion 13A of the shoe, the thermal expansion of a tetrafluoroethylene resin layer positioned closer to the reinforcing member is physically restricted by the reinforcing member. On the other hand, in the first main portion 13A of the shoe, the thermal expansion of a tetrafluoroethylene resin layer positioned far from the reinforcing member and closer to the surface 13 of the portion 13A is free from the physical restriction applied by the reinforcing member. Further, the reinforcing member always operates so as to physically restrict the thermal expansion of the second main portion 14A of the shoe, which has a thickness smaller than that of the first main portion 13A. Thus, the shoe of the present invention eventually causes a bending thereof upon being subjected to a high temperature. Consequently, the change in the shape of the shoe illustrated, for example, in FIG. 10 occurs.

(4) Since the shoe of the present invention contains therein the reinforcing member made of a metallic material, the physical strength of the shoe can be maintained at a high level.

(5) Since the shoe of the present invention is manufactured by employing a simple molding process, production cost can be maintained at a low level.

While the present invention has been described with reference to its preferred embodiments, it is to be understood that modifications will occur to those skilled in the art without departing from the spirit of the invention. For example, if preferred, the first and second main portions of the shoe made of the tetrafluoroethylene resin may contain appropriate metallic powder so as to increase the hardness of the main portions.

What is claimed is:

1. A round disc-shaped shoe having a given axial thickness, for use in a swash plate type compressor for transmitting an axial force from a rotating swash plate of the compressor to a piston of the compressor which applies an axially reciprocating compression force to a refrigerant within a cylinder bore of the compressor, comprising:

- a first main portion made of a tetrafluoroethylene resin material, and having an initially flat round surface for contacting said swash plate;
- a second main portion made of a tetrafluoroethylene resin, and formed with a concave recess in an exposed surface thereof for receiving a ball bearing operatively connected to said piston; and
- a bowl-shaped reinforcing member made of a metallic material, and embedded between said first and second main portions, said reinforcing member being axially positioned close to said concave recess of said second main portion and far from said flat round surface of said first main portion, said reinforcing member surrounding said recess and curving away from said initially flat round surface, thereby restricting thermal expansion of only the central part of said first main portion of said shoe, so that thermal expansion causes said initially flat round surface to assume an arcuate shape curving in the same direction as said reinforcing member.

2. A shoe according to claim 1, wherein said metalic material of said reinforcing member is selected from a spring steel and a carbon steel.

3. A shoe according to claim 1, wherein said reinforcing member comprises a cup-shaped member having a part-spherical wall formed with a plurality of bores, said bores being filled with tetrafluoroethylene resin material forming connecting portions for connecting said first and second main portions.

4. A shoe according to claim 3, wherein said cup-shaped member is positioned in said shoe so as to project toward said fist main portion.

5. A shoe according to claim 3, wherein said cup-shaped member is formed with slits, said slits being filled with said tetrafluoroethylene resin material forming connecting portions for connecting said first and second main portions.

6. A swash plate type compressor accommodating therein shoes according to claims 1, 2, 3, 4 or 5.

7. A shoe generally formed in a round disc-shape having an axial thickness, and incorporated into a swash plate type compressor for transmitting an axial force from a rotating swash plate of the compressor to a piston of the compressor which applies an axially reciprocal compression effect to a refrigerant within a cylinder bore of the compressor, comprising:

- a first main portion made of a tetrafluoroethylene resin material, and having a flat round surface contacting said swash plate;
- a second main portion made of a tetrafluoroethylene resin material, and formed with a round recess for receiving a ball bearing operatively connected to said piston; and
- a reinforcing member made of a metallic material and embedded between said first and second main portions, said reinforcing member being axially positioned close to said round recess of said second main portion and far from said flat round surface of said first main portion, said reinforcing member comprising a generally ring-shaped member having an annular portion and a plurality of legs projecting from said annular portion, said legs having positioning surfaces, respectively, lying in a common plane.

8. A shoe according to claim 7, wherein said generally ring-shaped member is stamped from a sheet of said metallic material.

9. A shoe according to claim 7, wherein said annular portion has a diameter thereof smaller than that of said shoe, so that first connecting portions connecting said first and second main portions are formed by said tetrafluoroethylene resin material filling spaces between said adjacent legs and so that second connecting portions connecting said first and second main portions are formed by said tetrafluoroethylene resin material filling a central bore of said annular portion of said reinforcing member.

10. A shoe generally formed in a round disc-shape having an axial thickness, and incorporated into a swash plate type compressor for transmitting an axial force from a rotating swash plate of the compressor to a piston of the compressor which applies an axially reciprocal compression effect to a refrigerant within a cylinder bore of the compressor, comprising:

a first main portion made of a tetrafluoroethylene resin material, and having a flat round surface contacting said swash plate;

a second main portion made of a tetrafluoroethylene resin material and formed with a round recess for receiving a ball bearing operatively connected to said piston; and a reinforcing member made of a metallic material and embedded between said first and second main portions, said reinforcing member being axially positioned close to said round recess of said second main portion and far from said flat round surface of said first main portion, said reinforcing member comprising a cup-shaped member having a part-spherical wall formed with a plurality of bores, and a plurality of legs projected from an uppermost edge of said part-spherical wall, said bores being filled with tetrafluoroethylene resin material forming connecting portions for connecting said first and second main portions, said legs having positioning surfaces, respectively, lying in a common plane.

* * * * *

UNITED STATES PATENT AND TRADEMARK OFFICE

CERTIFICATE OF CORRECTION

PATENT NO. : 4,268,225

DATED : May 19, 1981

INVENTOR(S) : Shozo Nakayama et al

It is certified that error appears in the above—identified patent and that said Letters Patent is hereby corrected as shown below:

| | |
|---|---|
| Abstract: line 4, | "metalic" should be --metallic-- |
| Abstract: line 5, | "two main portions the" should be --two main portions. The-- |
| Column 2, line 23: | "occurence" should be --occurrence-- |
| Column 3, line 1: | "metalic" should be --metallic-- |
| Column 4, line 7: | "metalic" should be --metallic-- |
| Column 4, line 28: | "protion" should be --portion-- |
| Column 5, line 67: | "mmechanical" should be --mechanical-- |
| Column 6, line 32: | "frist" should be --first-- |
| Column 6, line 62: | "metalic" should be --metallic-- |
| Column 6, line 66: | "(2)" should be the beginning of a new paragraph |
| Column 7, line 31: | "occurence" should be --occurrence-- |

UNITED STATES PATENT AND TRADEMARK OFFICE

CERTIFICATE OF CORRECTION

PATENT NO. : 4,268,225

DATED : May 19, 1981

INVENTOR(S) : Shozo Nakayama et al

It is certified that error appears in the above—identified patent and that said Letters Patent is hereby corrected as shown below:

In the Claims:

Column 8, line 33: "metalic" should be --metallic--

Column 8, line 44: "fist" should be --first--

Signed and Sealed this

*Twenty-second* Day of *June 1982*

[SEAL]

*Attest:*

GERALD J. MOSSINGHOFF

*Attesting Officer* *Commissioner of Patents and Trademarks*